J. W. DODD.
WHEEL CONSTRUCTION.
APPLICATION FILED MAY 2, 1911.
1,028,688.
Patented June 4, 1912.
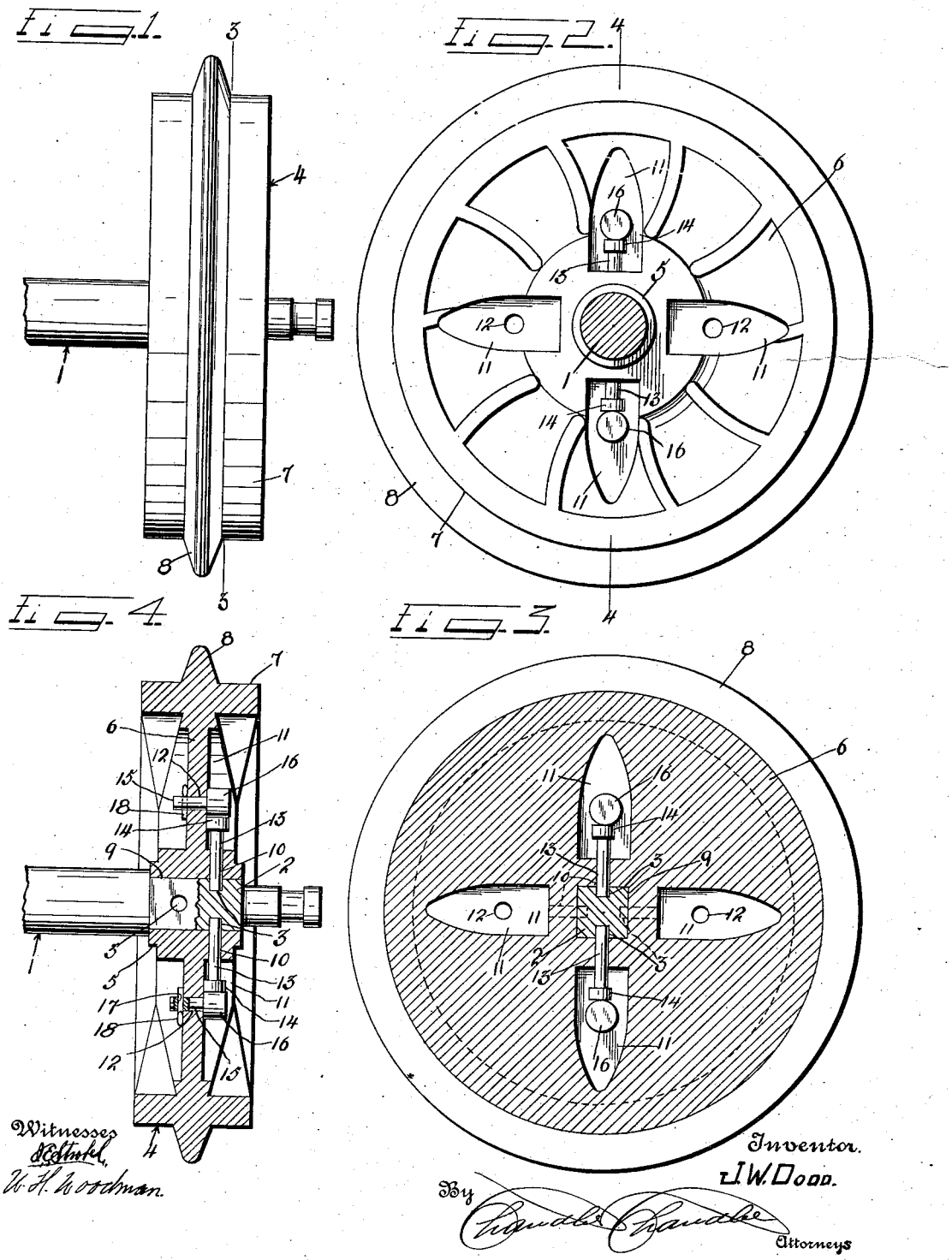

UNITED STATES PATENT OFFICE.

JOHN W. DODD, OF LYNCHBURG, VIRGINIA.

WHEEL CONSTRUCTION.

1,028,688.   Specification of Letters Patent.   Patented June 4, 1912.

Application filed May 2, 1911. Serial No. 624,598.

*To all whom it may concern:*

Be it known that I, JOHN W. DODD, a citizen of the United States, residing at Lynchburg, in the county of Campbell, State of Virginia, have invented certain new and useful Improvements in Wheel Constructions; and I do hereby declare the following to be a full, clear, and exact description of the invention, such as will enable others skilled in the art to which it appertains to make and use the same.

My invention relates to new and useful improvements in wheel constructions and more especially to detachable wheels for cars, and the object of my invention is to provide a wheel which may be easily secured to the axle of the car in such a manner as to revolve therewith but which may be easily removed when desired.

A further object of my invention is to provide a wheel of the above described character which shall be reversible, whereby when one tread becomes worn the wheel may be removed and then placed upon the axle again in the reverse position, thus bringing a fresh tread into engagement with the rail. And a still further object of my invention is to improve the construction and increase the efficiency of wheels of the above described character.

With these and other objects in view, my invention will be more fully described, illustrated in the drawings, and then specifically pointed out in the claims, which are attached to and form a part of this application.

In the accompanying drawings, which illustrate a preferred embodiment of my invention, Figure 1 is a front elevation of the wheel as applied to the axle, the axle bearing not being shown. Fig. 2 is a side elevation of the same. Fig. 3 is a section through the line 3—3 of Fig. 1. Fig. 4 is a section through the line 4—4 of Fig. 2.

Referring more specifically to the drawings, in which similar reference numerals designate corresponding parts throughout, 1 designates in general the axle of a car which as shown is provided adjacent its end with a squared portion 2, each face of which is provided with a radially extending socket 3, the positions of each of said sockets and the faces in which they are formed, being identical.

The wheel 4 as best shown in Figs. 1 and 2 of the drawings, consists of a hub member 5, a web member 6 and a tread member 7, said latter member being divided into two independent treads by means of the centrally located annular flange 8. The hub member 5 is provided with a squared bore 9 adapted to engage with the squared portion of the axle and adjacent either end of the hub and extending radially from each face of said bore is a bore 10, each of said bores terminating in a recess 11 formed in the face of the web. These bores are so positioned that the bores upon one end of the hub will register with the bores of the axle when the wheel is in one position, while the bores upon the other end of the hub will register with the bores of the axle when the wheel is in reversed position. Each recess is provided with a bore extending vertically through the web of the wheel, said bore being designated by the numeral 12, and as shown in the drawings these bores are slightly spaced away from the outer end of the bores 10.

The wheel as above described is secured upon the axle by means of pins 13 which are passed inwardly through the bores 10 until their inner ends are seated in the sockets 3 of the hub, in which position the heads 14 of the bolt are seated in the inner portions of said recesses, terminating adjacent the bores 12. Additional pins 15 are then passed through the bores 12 until their heads 16 are seated in the recesses 3, bearing against the heads 14 of the pins 13. These latter pins as shown, extend a slight distance beyond the web of the wheel and each is provided with a perforation 17 adapted to receive a cotter pin or other suitable fastener 18, by which means they are firmly secured in position.

It will be seen from the above description that the wheel is firmly secured to the axle by means of these pins in such a manner that it cannot possibly work loose, and at the same time the wheel may be readily removed and secured in reverse position. It will also be seen that the strain upon these pins is comparatively slight, as their only function is to prevent lateral movement of the wheel upon the axle, the squaring of the axle and of the bore of the hub effectually preventing all tendency toward independent rotation of the wheel.

I have shown and described my invention as applied to a reversible wheel for cars, but it will be understood that the same may be applied to any form of wheel, and to wheels used for any purpose whatsoever without in the slightest degree departing from the spirit of my invention.

It will also be understood that although I have shown the wheel as secured with but two pins, as many pins may be used as is deemed necessary to the proper securing of the wheel upon the axle.

What I claim is:—

1. In a wheel construction, the combination with a squared axle having sockets formed in the faces thereof, of a wheel including a hub having a squared bore, a web having recesses therein, said hub and web being provided with radial bores the inner ends of which register with the sockets of the axle, while their outer ends terminate in the recesses of the web, pins passing through said bore and engaging said socket, and means for maintaining said pins in place.

2. In a wheel construction, the combination with a squared axle having sockets formed in the faces thereof, of a wheel including a hub having a bore adapted to engage said axle and radial bores registering with the sockets of the axle, pins passed through said bores and engaging said sockets, said wheel also having a web provided with bores adjacent the heads of said pins, and pins passed through said latter bores and bearing against the first mentioned pin to maintain the same in position.

In testimony whereof, I affix my signature, in presence of two witnesses.

JOHN W. DODD.

Witnesses:
J. L. RYAN,
ROLAND T. HAMNER.

---

Copies of this patent may be obtained for five cents each, by addressing the "Commissioner of Patents Washington, D. C."